(12) United States Patent
Desota et al.

(10) Patent No.: US 8,898,674 B2
(45) Date of Patent: Nov. 25, 2014

(54) MEMORY DATABUS UTILIZATION MANAGEMENT SYSTEM AND COMPUTER PROGRAM PRODUCT

(75) Inventors: Donald R. Desota, Liberty Hill, TX (US); Rajendra D. Panda, Austin, TX (US); Venkat R. Indukuru, Austin, TX (US); Joseph H. Robichaux, Round Rock, TX (US); Robert H. Bell, Jr., Austin, TX (US); Steven P. Hartman, Round Rock, TX (US)

(73) Assignee: International Business Machines Corporation, Armonk, NY (US)

( * ) Notice: Subject to any disclaimer, the term of this patent is extended or adjusted under 35 U.S.C. 154(b) by 755 days.

(21) Appl. No.: 12/645,768

(22) Filed: Dec. 23, 2009

(65) Prior Publication Data

US 2011/0154352 A1    Jun. 23, 2011

(51) Int. Cl.
*G06F 9/46*    (2006.01)
*G06F 13/16*    (2006.01)
*G06F 9/50*    (2006.01)

(52) U.S. Cl.
CPC .............. *G06F 9/5011* (2013.01); *G06F 13/16* (2013.01); *G06F 9/5083* (2013.01)
USPC .......................................... 718/105; 718/104

(58) Field of Classification Search
None
See application file for complete search history.

(56) References Cited

U.S. PATENT DOCUMENTS

| | | | |
|---|---|---|---|
| 6,381,674 B2 | 4/2002 | DeKoning et al. | |
| 6,654,831 B1 | 11/2003 | Otterness et al. | |
| 6,687,224 B1 * | 2/2004 | Ater et al. | 370/230 |
| 6,807,586 B2 | 10/2004 | Berg et al. | |
| 7,159,082 B1 | 1/2007 | Wade | |
| 7,352,641 B1 | 4/2008 | Wu | |
| 7,418,561 B2 | 8/2008 | Kahn et al. | |
| 7,421,598 B2 * | 9/2008 | Brittain et al. | 713/320 |
| 7,586,944 B2 * | 9/2009 | Messick et al. | 370/468 |
| 2005/0125702 A1 * | 6/2005 | Huang et al. | 713/320 |
| 2007/0106860 A1 | 5/2007 | Foster, Sr. et al. | |

OTHER PUBLICATIONS

Annavaram, M. et al., Mitigaing Amdahl'S Law Through EPI Throttling, Proceedings of the 32nd International Symposium on Computer Architecture, ISCA '05, Jun. 2005.

Aragon, J. et al., Power Aware Control Speculation Through Selective Throttling, The Ninth International Symposium on High Performance Computer Architecture, Feb. 2003.

* cited by examiner

*Primary Examiner* — Abdullah Al Kawsar
*Assistant Examiner* — Wissam Rashid
(74) *Attorney, Agent, or Firm* — James L. Baudino

(57) ABSTRACT

According to one aspect of the present disclosure a system and computer program product for managing memory access is disclosed. The system includes a plurality of memory controllers each configured to maintain memory databus utilization by a corresponding processor at or below a threshold to maintain memory databus utilization of the system at or below a system threshold. The system also includes a service processor configured to receive memory databus utilization data from the memory controllers and programmed to, in response to determining that memory databus utilization for at least one of the processors is below its threshold, reallocate at least a portion of unused databus utilization from the at least one processor to at least one of the other processors.

13 Claims, 4 Drawing Sheets

MEMORY DATABUS UTILIZATION MANAGEMENT SYSTEM AND COMPUTER PROGRAM PRODUCT

BACKGROUND

In computer systems, "throttling" sometimes refers to slowing down and speeding up a computer's operations. Throttling is often performed to control power dissipation and/or thermal conditions of the computer system. Throttling can also be used in connection with a computer's memory devices. For example, a memory controller associated with a computer's processing unit may throttle the rate at which memory requests are made by the processing unit (e.g., requests to write data to memory or read data from memory). This memory throttling is often defined by number of memory accesses over some quantity of memory clock cycles.

BRIEF SUMMARY

According to one aspect of the present disclosure a system and computer program product for managing memory access is disclosed. The system includes a plurality of memory controllers each configured to maintain memory databus utilization by a corresponding processor at or below a threshold to maintain memory databus utilization of the system at or below a system threshold. The system also includes a service processor configured to receive memory databus utilization data from the memory controllers and programmed to, in response to determining that memory databus utilization for at least one of the processors is below its threshold, reallocate at least a portion of unused databus utilization from the at least one processor to at least one of the other processors.

BRIEF DESCRIPTION OF THE SEVERAL VIEWS OF THE DRAWINGS

For a more complete understanding of the present application, the objects and advantages thereof, reference is now made to the following descriptions taken in conjunction with the accompanying drawings, in which.

DETAILED DESCRIPTION

Figure 1:
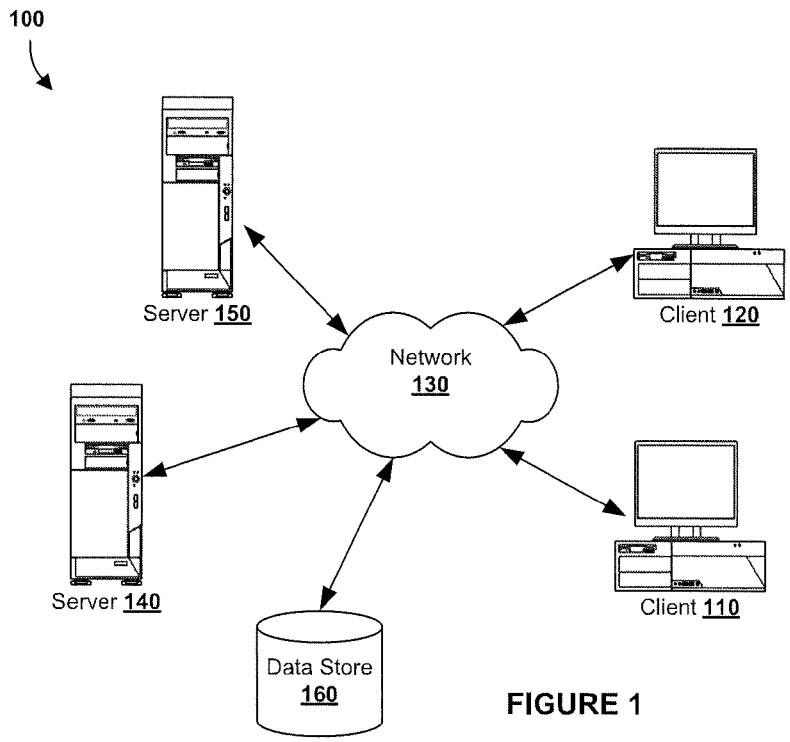
FIG. 1 is an embodiment of a network of data processing systems in which the illustrative embodiments of the present disclosure may be implemented.

Embodiments of the present disclosure provide a method, system and computer program product for managing memory access. For example, in some embodiments, in a data processing system having a number of processing units, a memory databus utilization threshold is set for the system to ensure that memory databus utilization for the overall system does not exceed a desired threshold. The memory databus utilization for each of the processing units is monitored such that, in response to determining that memory databus utilization for at least one of the processing units is below its threshold, at least a portion of the unused databus utilization bandwidth is reallocated to one or more other processing units.

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer usable or computer readable medium(s) may be utilized. The computer readable medium may be a computer readable signal medium or a computer readable storage medium. A computer readable storage medium may be, for example but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with and instruction execution system, apparatus or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure is described below with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Figure 2:
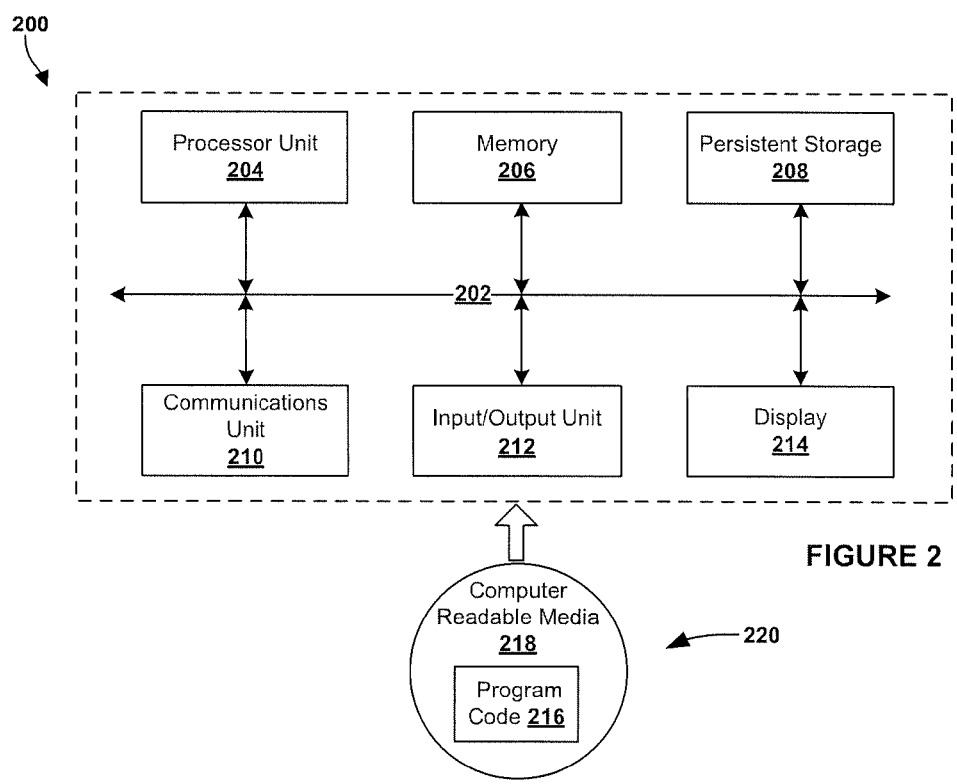
FIG. 2 is an embodiment of a data processing system in which the illustrative embodiments of the present disclosure may be implemented.

With reference now to the Figures and in particular with reference to FIGS. 1-2, exemplary diagrams of data processing environments are provided in which illustrative embodiments of the present disclosure may be implemented. It should be appreciated that FIGS. 1-2 are only exemplary and are not intended to assert or imply any limitation with regard to the environments in which different embodiments may be implemented. Many modifications to the depicted environments may be made.

FIG. 1 is a pictorial representation of a network of data processing systems in which illustrative embodiments of the present disclosure may be implemented. Network data processing system 100 is a network of computers in which the illustrative embodiments of the present disclosure may be implemented. Network data processing system 100 contains network 130, which is the medium used to provide communications links between various devices and computers connected together within network data processing system 100. Network 130 may include connections, such as wire, wireless communication links, or fiber optic cables.

In some embodiments, server 140 and server 150 connect to network 130 along with data store 160. Server 140 and server 150 may be, for example, IBM System p® servers. In addition, clients 110 and 120 connect to network 130. Clients 110 and 120 may be, for example, personal computers or network computers. In the depicted example, server 140 provides data and/or services such as, but not limited to, data files, operating system images, and applications to clients 110 and 120. Network data processing system 100 may include additional servers, clients, and other devices.

In the depicted example, network data processing system 100 is the Internet with network 130 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the different illustrative embodiments.

FIG. 2 is an embodiment of a data processing system 200 such as, but not limited to, client 110 in which an embodiment of a window navigation application according to the present disclosure may be implemented. In this embodiment, data processing system 200 includes communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a set of one or more processors or may be a multi-processor core, depending on the particular implementation. Further, processor unit 204 may be implemented using one or more heterogeneous processor systems in which a main processor is present with secondary processors on a single chip. As another illustrative example, processor unit 204 may be a symmetric multi-processor system containing multiple processors of the same type.

In some embodiments, memory 206 may be a random access memory or any other suitable volatile or non-volatile storage device. Persistent storage 208 may take various forms depending on the particular implementation. For example, persistent storage 208 may contain one or more components or devices. Persistent storage 208 may be a hard drive, a flash memory, a rewritable optical disk, a rewritable magnetic tape, or some combination of the above. The media used by persistent storage 208 also may be removable such as, but not limited to, a removable hard drive.

Communications unit 210 provides for communications with other data processing systems or devices. In these examples, communications unit 210 is a network interface card. Modems, cable modem and Ethernet cards are just a few of the currently available types of network interface adapters. Communications unit 210 may provide communications through the use of either or both physical and wireless communications links.

Input/output unit 212 enables input and output of data with other devices that may be connected to data processing system 200. In some embodiments, input/output unit 212 may provide a connection for user input through a keyboard and mouse. Further, input/output unit 212 may send output to a printer. Display 214 provides a mechanism to display information to a user.

Instructions for the operating system and applications or programs are located on persistent storage 208. These instructions may be loaded into memory 206 for execution by processor unit 204. The processes of the different embodiments may be performed by processor unit 204 using computer implemented instructions, which may be located in a memory, such as memory 206. These instructions are referred to as program code, computer usable program code, or computer readable program code that may be read and executed by a processor in processor unit 204. The program code in the different embodiments may be embodied on different physical or tangible computer readable media, such as memory 206 or persistent storage 208.

Program code 216 is located in a functional form on computer readable media 218 that is selectively removable and may be loaded onto or transferred to data processing system 200 for execution by processor unit 204. Program code 216 and computer readable media 218 form computer program product 220 in these examples. In one example, computer readable media 218 may be in a tangible form, such as, for example, an optical or magnetic disc that is inserted or placed into a drive or other device that is part of persistent storage 208 for transfer onto a storage device, such as a hard drive that is part of persistent storage 208. In a tangible form, computer readable media 218 also may take the form of a persistent storage, such as a hard drive, a thumb drive, or a flash memory that is connected to data processing system 200. The tangible form of computer readable media 218 is also referred to as computer recordable storage media. In some instances, computer readable media 218 may not be removable.

Alternatively, program code 216 may be transferred to data processing system 200 from computer readable media 218 through a communications link to communications unit 210 and/or through a connection to input/output unit 212. The communications link and/or the connection may be physical or wireless in the illustrative examples. The computer readable media also may take the form of non-tangible media, such as communications links or wireless transmissions containing the program code.

The different components illustrated for data processing system 200 are not meant to provide architectural limitations to the manner in which different embodiments may be implemented. The different illustrative embodiments may be implemented in a data processing system including components in addition to or in place of those illustrated for data processing system 200. Other components shown in FIG. 2 can be varied from the illustrative examples shown. For example, a storage device in data processing system 200 is any hardware apparatus that may store data. Memory 206, persistent storage 208, and computer readable media 218 are examples of storage devices in a tangible form.

Figure 3:
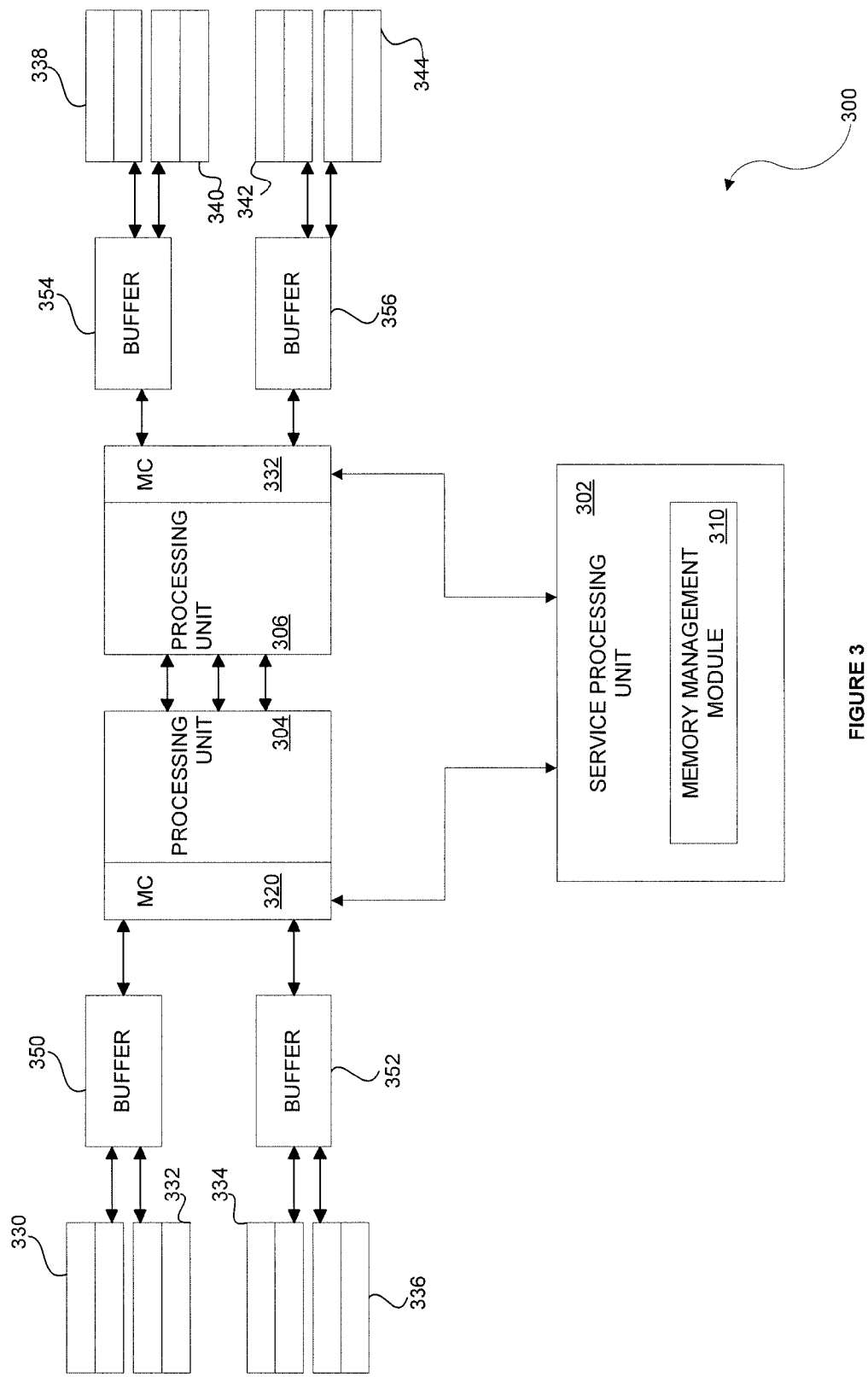
FIG. 3 is a diagram illustrating an embodiment of a data processing system in which illustrative embodiments of a memory management system may be implemented.

FIG. 3 is an embodiment of a memory management system 300. System 300 may be implemented on a data processing system or platform such as, but not limited to, servers 140 and/or 150, clients 110 and/or 120, or at other a data processing system locations. In the embodiment illustrated in FIG. 3, system 300 comprises a service processing unit 302 and processing units 304 and 306. In FIG. 3, service processing unit 302 includes a memory management module 310 for setting, analyzing and/or otherwise adjusting memory databus utilization thresholds for managed processors (e.g., processing units 304 and 306). In FIG. 3, two processing units 304 and 306 are illustrated; however, it should be understood that a greater number of processing units may be utilized and managed by memory management module 310.

In the illustrated embodiment, processing units 304 and 306 each include a memory controller 320 and 322, respectively, for controlling access to memory units 330, 332, 334, 336, 338, 340, 342 and 344, respectively. Memory units 330 through 344 may comprise dual inline memory modules (DIMMs) or any other type of memory component. In the illustrated embodiment, system 300 also comprises buffers 350, 352, 354 and 356 that are used by memory controllers 320 and 322, respectively, for buffering data between the memory units and the memory controller. In FIG. 3, memory management module 310 resides as software and/or an algorithm running on service processing unit 302; however, it should be understood that memory management module 310 may comprise hardware logic residing in a processor or other type of logic chip. The functions of memory management module may also be centralized in a single integrated circuit or distributed among different chips in a data processing system.

In operation, memory management module 310 is coupled to memory controllers 320 and 322 through two-way sets of signals to provide each of memory controllers 320 and 322 with a memory databus utilization threshold to be applied to respective processing units 304 and 306 and to dynamically adjust and/or reallocate unused memory databus utilization bandwidth between managed processing units. Further, memory management module 310 receives memory databus utilization data from memory controllers 320 and 322 indicating the actual utilization of memory databuses by corresponding processors to enable memory management module 310 to dynamically adjust memory databus utilization thresholds for certain processors while maintaining a system-wide memory databus utilization threshold. For example, it may be desired to maintain a memory databus utilization threshold across an entire data processing system. In this example, each of the processing units is monitored for its respective memory databus utilization and threshold values are communicated to each respective memory controller to maintain an overall system memory databus utilization threshold while also reallocating unused memory databus utilization bandwidth to processing units needing additional bandwidth.

Figure 4:
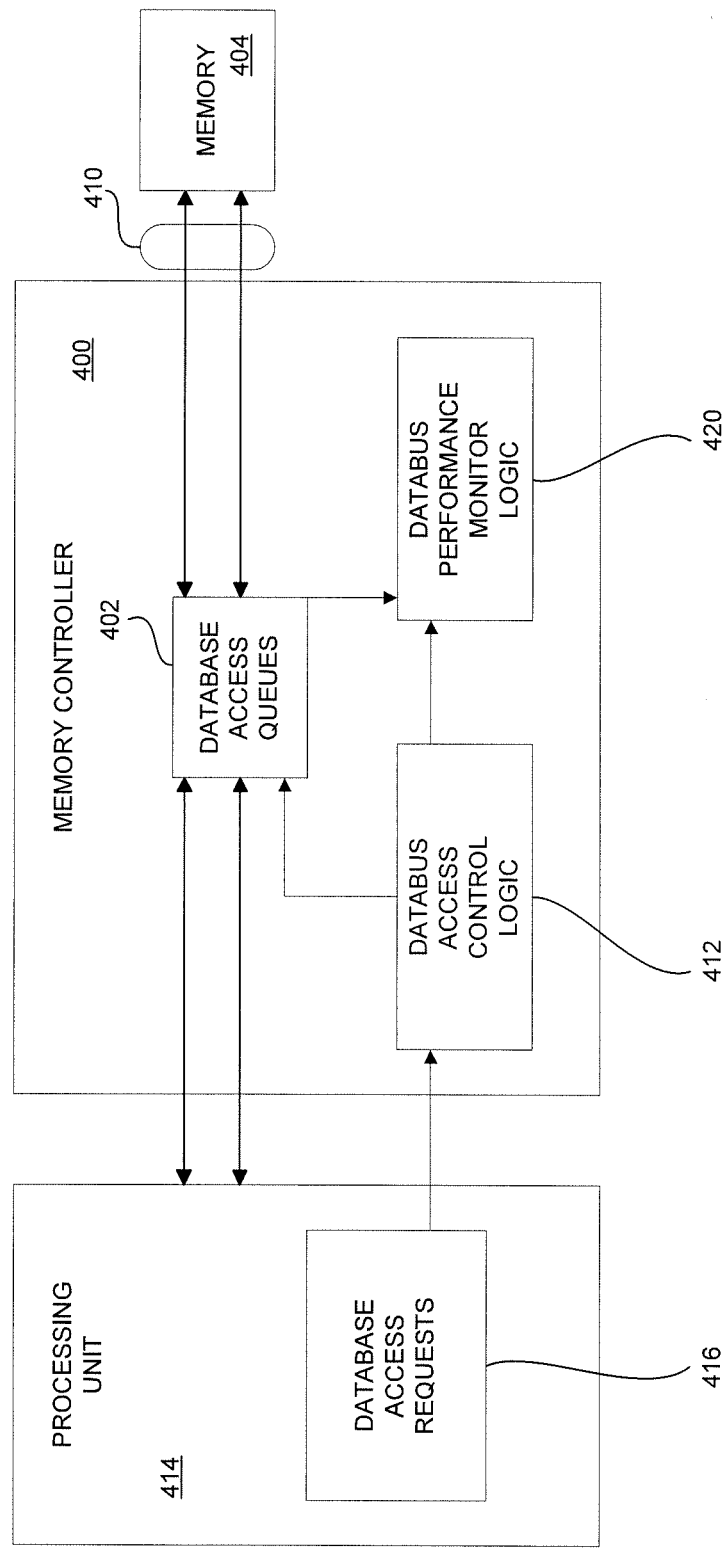
FIG. 4 is a diagram illustrating an embodiment of a memory controller in which illustrative embodiments of the present disclosure may be implemented.

FIG. 4 is a diagram illustrating an embodiment of a memory controller 400, such as memory controller 320 or 322 of FIG. 3. In FIG. 4, memory controller 400 includes memory databus access queues 402 that are used by memory controller 400 to buffer write data destined for a memory unit 404 (such as memory units 330 through 344 of FIG. 3) via a memory databus 410 and to buffer read data from memory unit 404 received from memory unit 404 via databus 410. The databus access queues 402 are controlled by databus access control logic 412 that receives read and write requests from a processing unit 414 (such as processing units 304 and 306 of FIG. 3) and determines which buffered write data will be written to memory unit 404 and which read data will be accessed from memory unit 404. Databus access control logic 412 receives databus access requests 416 from processing unit 414 and also controls utilization of memory databus 410 up to a memory utilization threshold as set by memory management module 310. For example, in some embodiments, the memory databus utilization threshold or throttle will be defined as a certain quantity of memory accesses within a window of a certain quantity of memory clock cycles. Thus, databus access control logic 412 controls access to its corresponding memory unit so as to not exceed the databus utilization threshold or throttle value.

In the embodiment illustrated in FIG. 4, memory controller 400 also includes databus performance monitor logic 420 which monitors and/or otherwise obtains the current memory databus utilization by processing unit 414 (e.g., by counting the databus slots (memory cycles)) that are currently utilized and dividing by the total number of slots that could have been utilized. The current memory databus utilization may be based on the utilization during a window of execution, such as 128 memory slots or longer. The current memory databus utilization data is transmitted over the signal interface to memory management module 310 (FIG. 3).

In operation, upon system initialization, memory management module 310 sets a memory databus utilization threshold for each processing unit and communicates the memory databus utilization threshold values to each respective memory controller corresponding to the respective processing units (e.g., memory controllers 320 and 322). In some embodiments, a system-wide memory databus utilization threshold may be desired such that the overall system-wide memory throttle is not exceeded when evaluated across all processing units of a data processing system. Thus, in some embodiments, upon system initialization, memory management module 310 may identify the system memory databus utilization threshold value and equally distribute the utilization bandwidth across all processing units of the system. However, it should be understood that the system memory databus utilization threshold may also be non-uniformly distributed across processing units of the system. For example, some memory components may be configured to require different power consumption limits or some processing units may typically use more memory databus utilization bandwidth than other processing units such that a memory databus utilization threshold may be greater for some processing units than other processing units.

During system operation, memory management module 310 monitors the actual or current memory databus utilization for each of the managed processing units and dynamically reallocates unused memory utilization bandwidth. For example, in response to determining that a particular processing unit is using less memory databus utilization than allowed based on its current databus utilization threshold, memory management module 310 may reallocate the unused utilization bandwidth to another processing unit. In this example, memory management module 310 dynamically adjusts the memory databus utilization thresholds for each corresponding processing unit (e.g., reducing the memory databus utilization threshold for a processor having unused utilization bandwidth and increasing a memory databus utilization threshold for processing units receiving the additional utilization bandwidth). In some embodiments, the unused memory databus utilization bandwidth may be distributed equally among other processing units or may be distributed non-uniformly to other processing units. For example, in some embodiments, memory management module 310 may analyze historic memory databus utilization for one or more processors to determine whether certain processors are likely to need additional memory databus utilization bandwidth and allocate the unused memory databus utilization bandwidth to those processors likely to need additional memory databus utilization bandwidth. Further, in some embodiments, the unused memory databus utilization bandwidth may be reallocated and/or otherwise distributed to those processors operating at or near their respective memory databus utilization thresholds.

Figure 5:
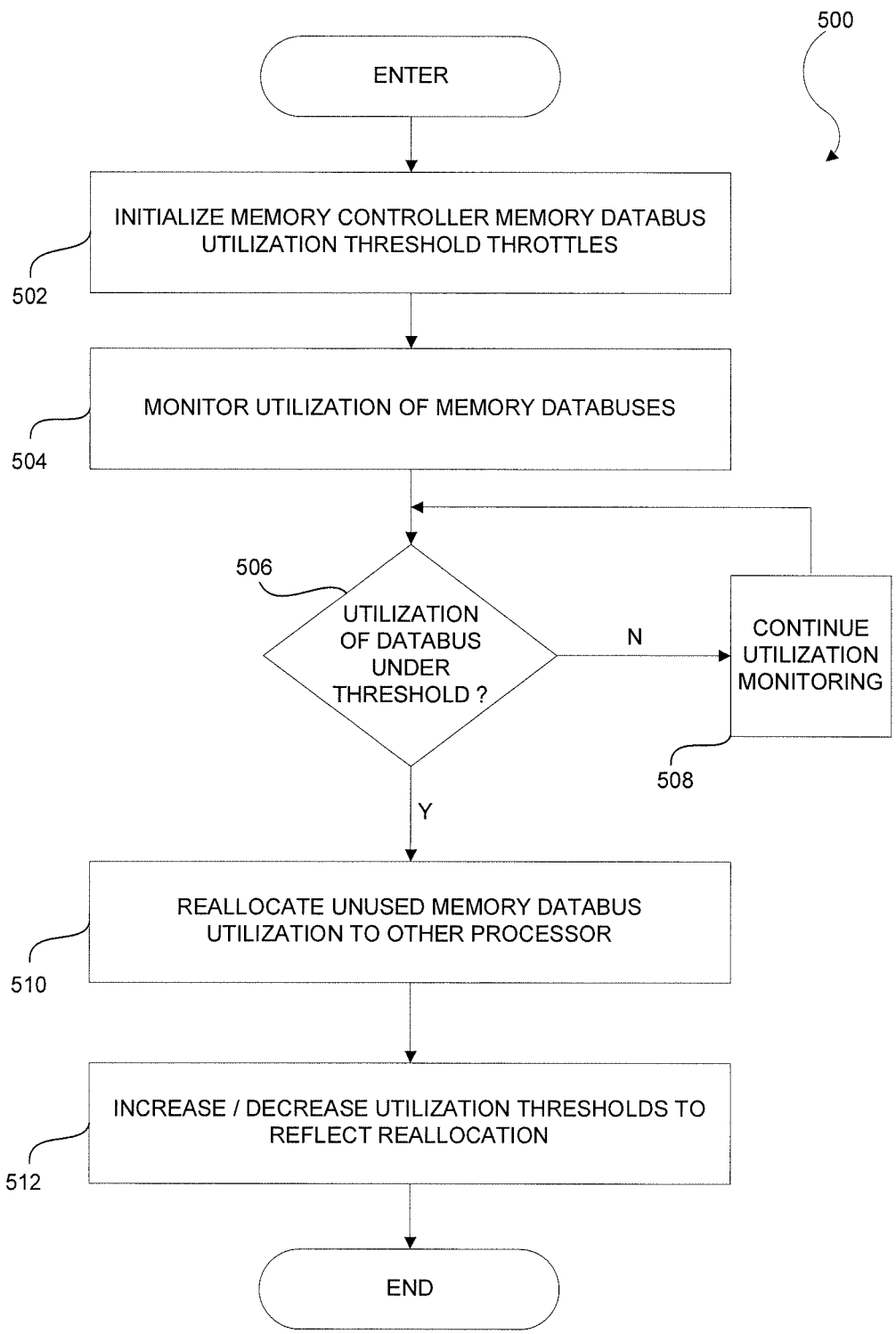
FIG. 5 is a flow diagram illustrating an embodiment of a memory management method.

FIG. 5 is a flow diagram illustrating an embodiment of a memory management method 500. The method begins at block 502, where, upon system initialization, memory controllers associated with each processor of the system are provided their respective memory databus utilization thresholds by memory management module 310. At block 504, the memory databus utilization of each processor is monitored. As indicated above, each respective memory controller may include databus performance monitor logic 420 (FIG. 4) that monitors memory access by its respective processor. The actual or current memory databus utilization data is communicated by each corresponding memory controller to memory management module 310. At block 506, a determination is made whether there is memory databus utilization bandwidth unused for one or more processors. For example, in some embodiments, memory management module 310 determines the memory databus utilization for each monitored processor and calculates how much of the system-wide memory databus utilization is unused by subtracting the current memory databus utilization of a particular processor from the current memory databus utilization threshold set for that particular processor. Memory management module 310 may also determine which processors are currently operating at or near their respective memory databus utilization thresholds. The unused memory databus utilization bandwidth from particular processors is then distributed and/or reallocated to other system processors, as indicated at block 510. If a determination is made that no unused memory databus utilization currently exists, the method proceeds to block 508 where memory management module 310 continues to monitor memory databus utilization for the monitored processors. At block 512, memory management module 310 increases and/or decreases the memory databus utilization thresholds for the affected and/or impacted processors. For example, for the processors having unused or excess memory databus utilization bandwidth, the memory databus utilization threshold is decreased in response to reallocating that unused memory databus utilization bandwidth to another processor. Correspondingly, the memory databus utilization thresholds for the processors receiving additional utilization bandwidth are increased.

It should also be understood that an amount of underutilized memory databus bandwidth to reallocate from a particular processor may vary. For example, in some embodiments, the memory databus utilization threshold for a processor having unused bandwidth may be reduced by a percentage of the unused bandwidth (e.g., 80%) to prevent repeated reallocation/retrieval of bandwidth for the particular processor. Further, in some embodiments, the time period for evaluating and/or reallocating unused memory databus bandwidth may vary (e.g., using a memory cycle time limit to perturb the memory databus utilization thresholds to determine whether the memory databus utilization bandwidths between processing units can be more equal to the system-wide memory databus utilization threshold). The memory databus utilization thresholds may also be applied to individual channels or sets of channels of a memory unit.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

What is claimed is:

1. A system comprising:
a plurality of memory controllers each configured to maintain memory databus utilization by a corresponding processor managed by a respective memory controller at or below a threshold set for each respective processor to maintain memory databus utilization of the system at or below a system threshold, wherein the memory databus utilization threshold for each respective processor is a quantity of memory accesses within a time window of a certain quantity of memory clock cycles; and
a service processor configured to receive memory databus utilization data from the memory controllers and programmed to, in response to determining that memory databus utilization for at least one of the processors is below its respective threshold, reallocate at least a portion of unused databus utilization from the at least one processor to at least one of the other processors by increasing the memory databus utilization threshold of the at least one of the other processors, wherein the memory databus utilization data are memory clock cycles currently utilized divided by the certain quantity of memory clock cycles within the time window.

2. The system of claim 1, wherein the service processor is programmed to equally reallocate the unused databus utilization among the other processors.

3. The system of claim 1, wherein the service processor is programmed to reallocate the unused databus utilization to at least one other processor operating at its memory databus utilization threshold.

4. The system of claim 1, wherein the service processor is programmed to analyze historic databus utilization for the plurality of processors, and reallocate the unused databus utilization to at least one of the other processors based on the historic databus utilization for the one other processor.

5. The system of claim 1, wherein the service processor is programmed to initialize the memory databus utilization threshold for each of the plurality of processors by equally distributing the system memory databus utilization threshold among the plurality of processors.

6. The system of claim 1, wherein the service processor is programmed to reduce the memory databus utilization threshold for the processor having the unused memory databus utilization.

7. A computer program product for memory management, the computer program product comprising:
a non-transitory computer readable storage medium having computer readable program code embodied therewith, the computer readable program code comprising computer readable program code configured to:
analyze memory databus utilization by each of a plurality of processors compared to a memory databus utilization threshold set for each respective processor, the memory databus utilization thresholds set to maintain a memory databus utilization for a data processing system at or below a system memory databus utilization threshold, wherein the memory databus utilization threshold for each respective processor is a quantity of memory accesses within a time window of a certain quantity of memory clock cycles; and
in response to determining that memory databus utilization for at least one of the processors is below its respective threshold, reallocate at least a portion of unused databus utilization from the at least one processor to at least one of the other processors by increasing the memory databus utilization threshold of the at least one of the other processors, wherein the memory databus utilization data are memory clock cycles currently utilized divided by the certain quantity of memory clock cycles within the time window.

8. The computer program product of claim 7, wherein the service processor is programmed to equally reallocate the unused databus utilization among the other processors.

9. The computer program product of claim 7, wherein the service processor is programmed to reallocate the unused databus utilization to at least one other processor operating at its memory databus utilization threshold.

10. The computer program product of claim 7, wherein the service processor is programmed to analyze historic databus utilization for the plurality of processors, and
reallocate the unused databus utilization to at least one of the other processors based on the historic databus utilization for the one other processor.

11. The computer program product of claim 7, wherein the service processor is programmed to initialize the memory databus utilization threshold for each of the plurality of processors by equally distributing the system memory databus utilization threshold among the plurality of processors.

12. The computer program product of claim 7, wherein the service processor is programmed to reduce the memory databus utilization threshold for the processor having the unused memory databus utilization.

13. A system comprising:
a plurality of processors;
a plurality of memory units, each memory unit accessible by at least one of the processors;
a plurality of memory controllers, each memory controller configured to manage accesses to a respective memory unit by a respective processor managed by a respective memory controller; and
a service processor comprising a management module configured to set for each of the plurality of processors a databus utilization threshold for utilizing a databus for accessing a respective memory unit by a respective processor to maintain a memory databus utilization of the system at or below a system threshold, the databus utilization threshold defining a quantity of accesses to a respective memory unit by a respective processor within a defined time window of a certain quantity of memory clock cycles; and
wherein each memory controller is configured to receive a respective databus utilization threshold for the respective processor managed by the respective memory controller and manage accesses to a respective memory unit by a respective managed processor according to the databus utilization threshold set for the respective processor; and
wherein the management module is configured to receive memory databus utilization data from the respective memory controllers indicating utilization of a respective databus by a respective processor and programmed to, in response to determining that utilization of a respective databus for at least one of the processors is below its respective threshold, reallocate at least a portion of unused databus utilization from the at least one processor to at least one of the other processors by increasing the memory databus utilization threshold of the at least one of the other processors, wherein the memory databus utilization data are memory clock cycles currently utilized divided by the certain quantity of memory clock cycles within the time window.

* * * * *